(12) United States Patent
Harrison et al.

(10) Patent No.: US 9,213,333 B2
(45) Date of Patent: Dec. 15, 2015

(54) REMOTE OPERATOR STATION

(71) Applicant: Caterpillar Inc., Peoria, IL (US)

(72) Inventors: Brent R. Harrison, Peoria, IL (US); Jeffrey A. Brush, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 322 days.

(21) Appl. No.: 13/911,179

(22) Filed: Jun. 6, 2013

(65) Prior Publication Data

US 2014/0365031 A1    Dec. 11, 2014

(51) Int. Cl.
*G05D 1/00*    (2006.01)

(52) U.S. Cl.
CPC .................................. *G05D 1/0038* (2013.01)

(58) Field of Classification Search
None
See application file for complete search history.

(56) References Cited

U.S. PATENT DOCUMENTS

| 3,112,002 | A | 11/1963 | Van Der |
| 4,855,822 | A * | 8/1989 | Narendra et al. ............. 348/114 |
| 6,450,284 | B1 * | 9/2002 | Sakyo et al. .................. 180/329 |
| 6,629,572 | B2 * | 10/2003 | Womer et al. ................. 175/219 |
| 6,633,800 | B1 * | 10/2003 | Ward et al. ........................ 701/2 |
| 6,782,644 | B2 * | 8/2004 | Fujishima et al. ............. 37/348 |
| 7,010,367 | B2 * | 3/2006 | Koch et al. ....................... 700/85 |
| 7,243,982 | B2 * | 7/2007 | Kelley et al. ............. 296/190.08 |
| D555,676 | S * | 11/2007 | Haubrich et al. ............... D15/28 |
| 7,831,363 | B2 * | 11/2010 | Quigley .......................... 701/50 |
| 8,089,225 | B2 * | 1/2012 | Goossen ......................... 318/16 |
| 8,139,108 | B2 * | 3/2012 | Stratton et al. ................ 348/114 |
| 8,272,467 | B1 * | 9/2012 | Staab ............................ 180/167 |
| 8,646,826 | B2 * | 2/2014 | Wihinen et al. ................. 296/71 |
| 8,944,201 | B2 * | 2/2015 | Krellner et al. ............. 180/89.12 |
| 8,985,263 | B2 * | 3/2015 | Peterson et al. .............. 180/329 |
| 9,057,221 | B2 * | 6/2015 | Warr ..................................... 1/1 |
| 2002/0117017 | A1 * | 8/2002 | Bernhardt et al. ........ 74/471 XY |
| 2003/0036817 | A1 * | 2/2003 | Morley et al. ................. 700/245 |
| 2003/0144771 | A1 * | 7/2003 | Proulx ............................. 701/19 |
| 2003/0230447 | A1 * | 12/2003 | Wulfert et al. ................ 180/329 |
| 2006/0206244 | A1 * | 9/2006 | Arvidsson .......................... 701/2 |
| 2006/0224280 | A1 * | 10/2006 | Flanigan et al. ................... 701/2 |
| 2008/0180272 | A1 * | 7/2008 | Scherer .................... 340/825.72 |

(Continued)

FOREIGN PATENT DOCUMENTS

| DE | 202008000337 | 5/2008 |
| EP | 1995111 | 11/2008 |

(Continued)

OTHER PUBLICATIONS

Cat Simulators, Product Overview: Hydraulic Excavator, [online], (retrieved on Mar. 20, 2013) Retrieved from the products databse of the Cat Simulators website using internet <URL: http>www.catsimulators.com>.

*Primary Examiner* — Jonathan M Dager

(57) ABSTRACT

A mounting structure for a remote operator station is provided. The mounting structure includes a frame having a first section, and a second section disposed adjacently in elevated relation with respect to the first section. The frame further includes a forward support member extending upward from an end of the first section and a rearward support member extending downward from an end of the second section. The structure further includes an upright support element removably coupled to the forward support member of the frame via a first coupling system. The structure further includes a laterally extending support element removably coupled to at least one of lateral sides of the second section of the frame via a second coupling system.

20 Claims, 3 Drawing Sheets

(56) References Cited

U.S. PATENT DOCUMENTS

| | | | |
|---|---|---|---|
| 2009/0163283 A1* | 6/2009 | Childress | 463/47 |
| 2009/0177337 A1* | 7/2009 | Yuet et al. | 701/2 |
| 2011/0282519 A1* | 11/2011 | Carlsson | 701/2 |
| 2012/0136525 A1* | 5/2012 | Everett et al. | 701/24 |
| 2014/0060216 A1* | 3/2014 | Smith et al. | 73/865.6 |
| 2014/0087334 A1* | 3/2014 | Schlusselberger | 434/29 |
| 2014/0331129 A1* | 11/2014 | Saeki et al. | 715/702 |

FOREIGN PATENT DOCUMENTS

| | | |
|---|---|---|
| EP | 2228252 | 9/2010 |
| WO | 03086941 | 10/2003 |

\* cited by examiner

REMOTE OPERATOR STATION

TECHNICAL FIELD

The present disclosure relates to a remote operator station of a machine and more particularly to a mounting structure for the remote operator station of the machine.

BACKGROUND

A remote operator station (ROS) for a machine allows an operator to control the machine from a remote location. The machine may be employed on an actual worksite while the ROS may be positioned indoors. U.S. Pat. No. 6,633,800 discloses an apparatus and method for a control unit which allows for autonomous, manual and tele-operation of mining vehicles. The control unit has a robust system design to withstand the harsh environment of underground mines The control unit allows a tele-operator, in a remote tele-operator station, to use image and operational data, joysticks and foot pedals to remotely control the mining vehicle. In another aspect, the control unit provides safety features such as supervising its operation for operational errors and providing status, warning and error information to the tele-operator station.

SUMMARY

In one aspect, the present disclosure provides a mounting structure for a remote operator station of a machine. The mounting structure includes a frame. The frame includes a first section configured to rest on a ground surface. The frame includes a second section disposed adjacently in elevated relation with respect to the first section. The frame further includes interconnecting members extending between the first section and the second section. The frame further includes a forward support member extending upward from an end of the first section and a rearward support member extending downward from an end of the second section. The structure further includes an upright support element removably coupled to the forward support member of the frame via a first coupling system. The structure further includes a laterally extending support element removably coupled to at least one of lateral sides of the second section of the frame via a second coupling system, wherein the first coupling system includes a flange coupled to the upright support element, a lower end of the upright support element extending beyond the flange.

In another aspect, the present disclosure provides a remote operator station for a machine. The remote operator station includes a seat, a first interface device, and a second interface device. The remote operator station further includes the mounting structure. The mounting structure includes the frame. The frame includes the first section configured to rest on the ground surface. The frame includes the second section disposed adjacently in elevated relation with respect to the first section. The frame further includes interconnecting members extending between the first section and the second section. The frame further includes the forward support member extending upward from the end of the first section and the rearward support member extending downward from the end of the second section. The structure further includes the upright support element removably coupled to the forward support member of the frame via the first coupling system. The structure further includes the laterally extending support element removably coupled to at least one of lateral sides of the second section of the frame via the second coupling system, wherein the first coupling system includes the flange coupled to the upright support element, the lower end of the upright support element extending beyond the flange.

DETAILED DESCRIPTION

Figure 1:
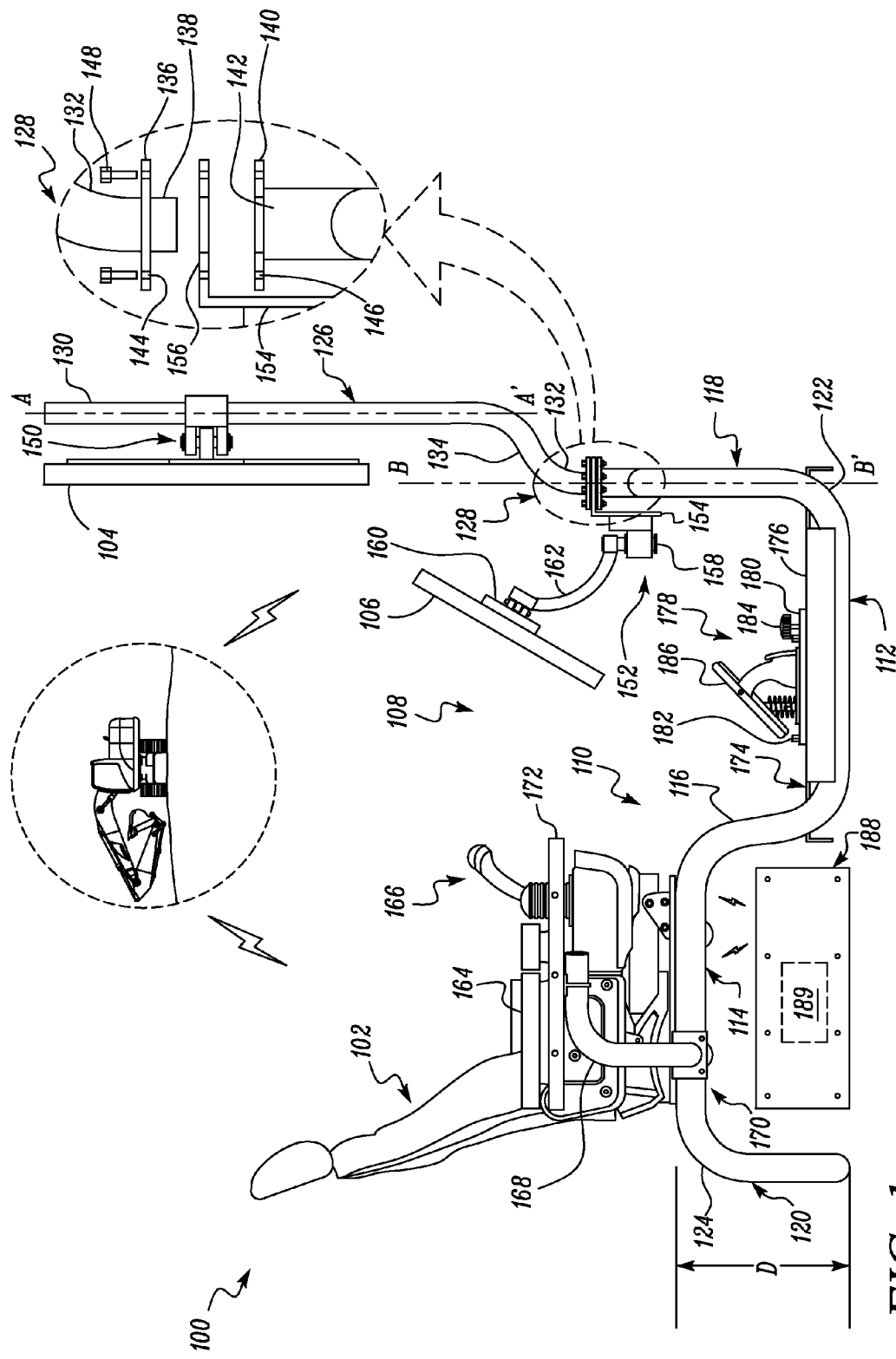
FIG. 1 illustrates side view of a remote operator station.

The present disclosure relates to a mounting structure for a remote operator station for a machine. FIG. 1 shows a side view of a remote operator station (ROS) 100 in accordance with an embodiment of the present disclosure. In an embodiment, the ROS 100 may be used for remotely operating machines such as but not limited to, backhoe loaders, skid steer loaders, wheel loaders, material loaders, motor graders, track-type tractors, landfill compactors, excavators, articulated trucks, and compactors. However, in other embodiments, the ROS 100 can be used to providing a simulating environment of a real time operation of the machine and impart training to prospective operators.

The ROS 100 includes a seat 102, a first interface device 104, a second interface device 106, and a mounting structure 108. The mounting structure 108 includes a frame 110. The frame 110 includes a first section 112, a second section 114, and interconnecting members 116. The second section 114 may be disposed adjacently and may be in an elevated relation with respect to the first section 112. The interconnecting members 116 extend between the first section 112 and the second section 114. In an embodiment, the second section 114 may be at an elevation D with respect to the first section 112.

The frame 110 includes a forward support member 118 and a rearward support member 120. The forward support member 118 may extend upwardly from an end 122 of the first section 112. The rearward support member 120 may extend downwardly from an end 124 of the second section 114. In an embodiment, the rearward support member 120 may extend downwardly by a distance substantially equal to the elevation D, such that the rearward support member 120 and the first section 112 are configured to rest on an even ground surface while supporting the ROS 100.

According to one embodiment as shown in FIG. 1, the mounting structure 108 includes an upright support element 126 removably coupled to the forward support member 118 via a first coupling system 128. The upright support element 126 may include a first portion 130 and a second portion 132 disposed about a first axis AA' and a second axis BB' respectively, wherein the second axis BB' is offset from the first axis AA'. Further, the upright support element 126 further defines a connecting portion 134 transversely extending between the first portion 130 and the second portion 132, for example, extending in the rearward direction.

In an embodiment, the first coupling system 128 is configured to removably couple the upright support element 126 to the forward support member 118. In one example, the first coupling system 128 may include an upper flange 136 coupled to the second portion 132 of the upright support element 126 while a lower end 138 of the upright support element 126 extends beyond the upper flange 136. The first coupling system 128 may further include a lower flange 140 coupled to the forward support member 118 of the frame 110.

The lower flange 140 may include an opening 142 formed therein. Upon assembling the upright support element 126 to the forward support member 118, the lower end 138 of the upright support element 126 is received into the opening 142 until the upper and lower flanges 136, 140 are disposed in an adjacent interconnected relationship. To help fixedly secure the flanges, the upper and lower flanges 136, 140 may each include bolt holes 144, 146 formed respectively therein. One or more fasteners 148, such as bolts, rivets, or other types of mechanical fasteners, can be received in the bolt holes 144, 146 when aligned to rigidly support the upright support element 126 on the forward support member 118 of the frame 110. The first coupling system 128 may be secured by other known mechanisms, such as, e.g., a clamping mechanism, welding, soldering, adhesives, Velcro.

In an embodiment as shown in FIG. 1, the first interface device 104 is clamped onto the first portion 130 of the upright support element 126 using a first mounting assembly 150. The first mounting assembly 150 may be a swivel mount including brackets 204 and threaded fasteners such that the first interface device 104 can be vertically adjusted by sliding along or rotationally adjusted by rotating about the first portion 130 of the upright support element 126. The first mounting assembly 150 may allow for tilt adjustment through a tilt mechanism (not shown) to place the upper end closer to the user than the lower end of the first interface device 104. The first mounting assembly 150 may allow for roll adjustment through a roll mechanism (not shown) to reorient the first interface device 104 in the clockwise or counter clockwise direction.

In another embodiment, the second interface device 106 is coupled to the frame 110 using a second mounting assembly 152. The second mounting assembly 152 includes a mounting bracket 204 154 having a flap portion 156 releasably supported between the upper and lower flanges 136, 140. The mounting bracket 204 is configured to releasably support the second interface device 106. The second mounting assembly 152 may further include a swivel mount 158 with a clamping member 160 and a handle 162. The swivel mount 158 may allow the second interface device 106 to be panned laterally or tilted in an upward or downward direction during use.

In an embodiment, the first interface device 104 may be a display panel configured to render a camera feed of an actual worksite. In one embodiment, the second interface device 106 may be a display panel configured to display visual information in the form of pictures, video feeds, texts, and graphics to an operator. Further, the second interface device 106 may display real-time machine characteristics such as, speed, engine temperature, and position information. However, in alternative embodiments, the second interface device 106 may be employed as a control device or an input device, such as but not limited to touch based user interfaces that are configured to receive input signals from an operator and control operation of the machine.

As illustrated in FIG. 1, the seat 102 is supported on the second section 114. The seat 102 may include one or more armrests 164 with integrated input devices 166 such as a joystick, levers, or push-buttons. In an embodiment, the seat 102 may include adjustment mechanisms (not shown) to adjust a recline angle of the seat 102. Further, the mounting structure 108 may include two laterally extending support elements 168 (only one laterally extending support element 168 is shown in FIG. 1) removably coupled to lateral sides of the second section 114 via a second coupling system 170. The laterally extending support elements 168 may releasably support console plates 172 (only one console plate 172 is shown in FIG. 1). The console plates 172 may be used to support various computer peripherals such as, but not limited to, a keyboard, a mouse, audio devices, or the like. Additionally, the console plates 172 may also include a cup-holder, a phone-holder, and commonly known ports or sockets for connecting devices such as microphones, printers, routers and the like.

The mounting structure 108 further includes a floorboard 174 disposed on the first section 112 of the frame 110. The floorboard 174 may be fastened to the first section 112 of the frame 110 by using commonly known fasteners such as bolts, screws, and rivets. Alternatively, the floorboard 174 may be attached onto the first section 112 by processes such as welding. The floorboard 174 includes an upper surface 176 to support a pedal assembly 178 thereon. The pedal assembly 178 may include a pedal plate 180 adjustably secured to the floorboard 174 using a plurality of pins 182 and an adjuster 184. The pedal assembly 178 may include further one or more foot pedals 186 disposed on the pedal plate 180.

As shown in FIG. 1, the ROS 100 includes an enclosure 188 configured to house a controller 189 including power electronics and circuit components therein. The power electronics and circuit components disclosed herein may be associated with the interface devices, input devices 166, and other peripherals of the ROS 100, and may also provide hardware and software support to remotely operate the machine. The controller 189 may be configured to receive machine signals from the machine indicative of machine operation at a discrete location and the machine characteristics such as, speed, engine temperature, and position information. The controller 189 is configured to process the received machine signals to indicate machine operation using the interface devices 104, 106. In an embodiment, the controller 189 may be configured to communicate with one or more camera devices for generating images of the machine, and sensor apparatus using a wireless communication apparatus such as a radio frequency based apparatus to provide the machine signals to the ROS 100 on the real time basis. Further, the controller 189 may operatively couple with the input devices 166, the second interface device 106, and the foot pedals 186 to receive and process the input signals and convert to instruction signals to communicate the instruction signals to the machine for a desired response of the machine. Numerous commercially available microprocessors or processors can be configured to form the power electronics and circuit components. It should also be appreciated that the enclosure 188 could readily be embodied in a general purpose machine cabinet such as a CPU cabinet wherein the power electronics and the circuit components may include a memory, a secondary storage device, a processor, and other components for running an application. Further, various other circuits may be associated with the controller such as power supply circuitry, signal conditioning circuitry, or other types of circuitry. Various routines, algorithms, and/or programs can be programmed within these circuit components.

Figure 2:
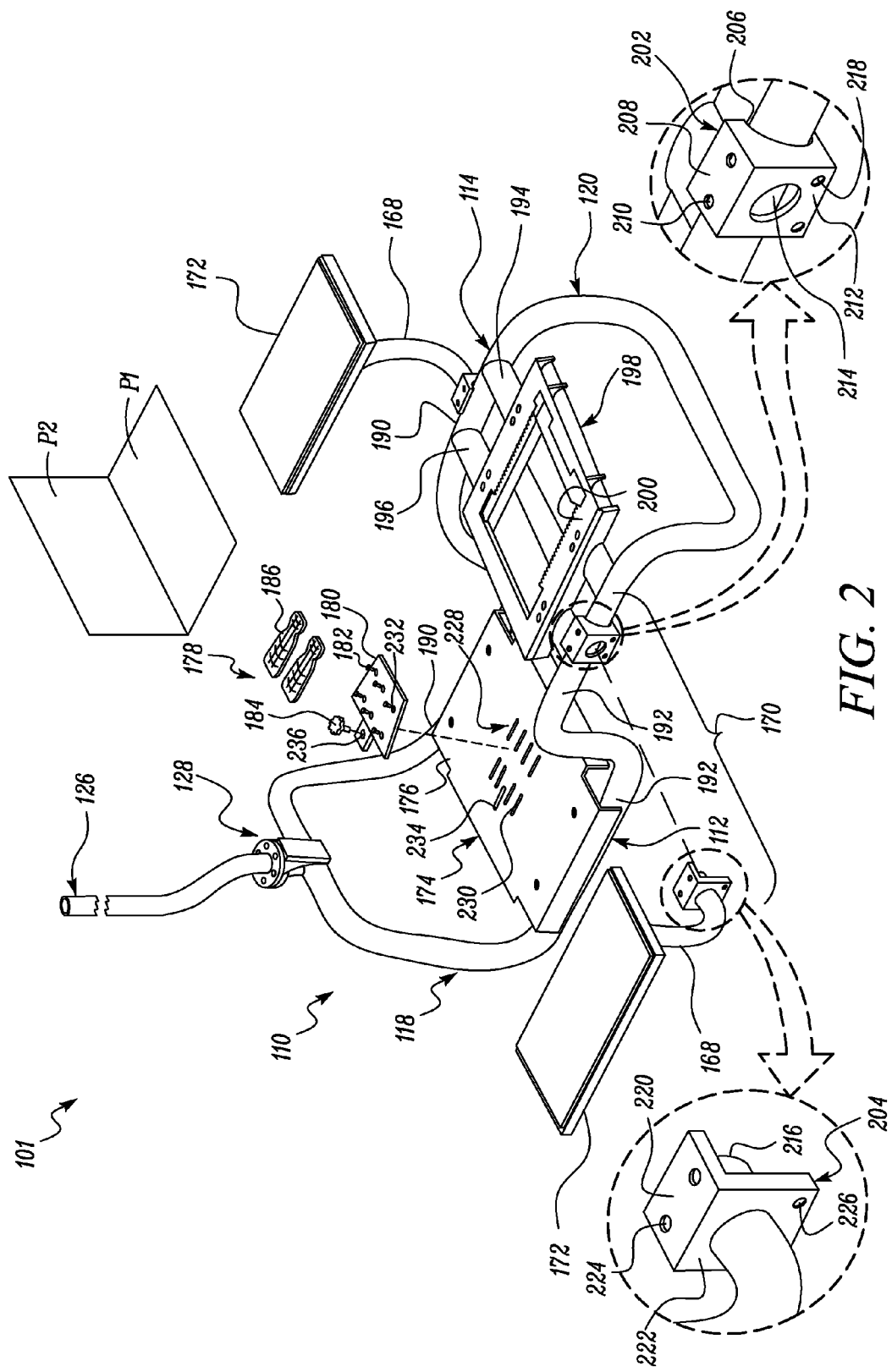
FIG. 2 illustrates a exploded view of the remote operator station of FIG. 1.

FIG. 2 illustrates a perspective view of the mounting structure 108. The first and the second sections 112, 114 of the frame 110 include a first tubular member 190 and a second tubular member 192. The first and second tubular members 190, 192 are laterally spaced apart from each other along a first plane P1. The first and second tubular members 190, 192 may extend upwardly from the ends 122 of the first section 112 in a second plane P2, wherein the second plane P2 is substantially orthogonal to the first plane P1. Thereafter, the first and second tubular members 190, 192 converge into each other and form the forward support member 118. Similarly, in the second section 114, the first and second tubular members 190, 192 may extend downwardly from the second section 114 along the second plane P2. Thereafter, the first and second tubular members 190, 192 may converge into each other and form the rearward support member 120. In one embodiment, the first and second tubular members 190, 192 may be made of hydro-formed steel tubes bent and twisted about the planes P1 and P2 to unitarily form the frame 110. In alternative embodiments, the first and second tubular members 190, 192 may be made from carbon-fibre-reinforced polymers, having resistance to wear and deterioration. It can be appreciated that the first and second tubular members 190, 192 can be any known tubular member or members attached in any fashion such as welding.

As shown in FIG. 2, the second section 114 of the frame 110 includes a first cross bar 194 and a second cross bar 196 disposed laterally between the first and second tubular members 190, 192. The cross bars 194, 196 may be welded or brazed to the first and second tubular members 190, 192, at the second section 114. The cross bars 194, 196 may be configured to support the seat 102. In an embodiment, a seat mount 198 may be attached to the cross bars 194, 196. The seat mount 198 may be of any known configuration such that the seat 102 may be mounted on the seat mount 198. In one embodiment, the seat mount 198 may define mounting plates 200 configured to be fastened to the cross bars 194, 196 using mechanical fasteners. The seat mount 198 may further include means, such as rollers or ratchet, to slide the seat 102 on the second section 114.

As illustrated in FIG. 2, the second coupling system 170 may include a coupler 202 coupled to the tubular members, at the second section 114. The second coupling system 170 may further include a bracket 204 attached to the laterally extending support element 168. The coupler 202 is located adjacent to the cross bars 194, 196 at the second section 114, and is configured to removably couple with the bracket 204. In an embodiment as shown in FIG. 2, the coupler 202 includes an interior section 206 having a profile corresponding to the profile on the tubular members. Therefore, the coupler 202 abuts the tubular members, and may be welded thereon. Alternatively, the coupler 202 may be integrally formed with the tubular members. The coupler 202 further includes an upward face 208 defining one or more receptacles 210 formed therein which may be threaded. Further, the coupler 202 includes an outward face 212 having an opening 214 formed therein configured to receive an end portion 216 of the laterally extending support element 168. The outward face 212 further includes one or one or more receptacles 218 which may be threaded. The bracket 204 also includes a lateral plate 220 and a longitudinal plate 222 defining holes 224, 226 therein. The holes 224, 226 are configured to align with the receptacles 214, 218 respectively, and receive mechanical fasteners such as, e.g., threaded fasteners (not shown) therein.

In an embodiment as shown in FIG. 2, the floorboard 174 can include a grooved arrangement 228 including multiple slotted grooves 230 formed therein. The grooved arrangement 228 is configured to interface with the pedal plate 180 spanning at least a portion of the grooved arrangement 228. The pedal plate 180 can include the pins 182 extending from its lower surface to be slidably inserted within corresponding slotted grooves 230 of the floor board. The pins and groove size relationship can be such to inhibit relative lateral movement. In an exemplary embodiment, the pedal plate 180 may include openings 232 formed therein to receive fasteners therein that define the pins 182. These fasteners may be threadably engaged with nuts (not shown) disposed underneath the slotted grooves 230 of the floorboard 174. The floorboard 174 may include an alignment slot 234 formed therein and the pedal plate 180 may include a hole 236 formed therein. The alignment slot 234 and the hole 236 may receive the adjuster 184 therein. Therefore, the pedal plate 180 may be slidably engaged with the groove arrangement 228 and selectively fixed at a position on the floorboard 174 by fixation or locking of the adjuster 184. While the adjuster 184 is in an unlocked condition, the pedal assembly 178 may be adjusted forwardly or rearwardly on the floorboard 174 at any position and between the maximum and minimum positions as defined by the length of the alignment slots 234. In one example, the adjuster 184 includes a handle with a threaded shaft extending therefrom, in which the threaded shaft extends through the hole 236 and the alignment slot 234. In one example, the hole 236 and/or alignment slot 236 may be threadably engaged with the threaded shaft to facilitate locking and unlocking of the adjuster 184. In one example, a nut may be disposed underneath the floorboard 174 for threadable engagement with the threaded shaft to facilitate locking and unlocking of the adjuster 184.

INDUSTRIAL APPLICABILITY

A ROS 100 for a machine allows an operator to control the machine from a remote location. The machine may be employed on an actual worksite while the ROS 100 may be positioned indoors. Some previously known ROS were bulky and heavy in construction. Hence, these previously known mounting structures were difficult to pass through narrow passages and install in constrained spaces.

Figure 3:
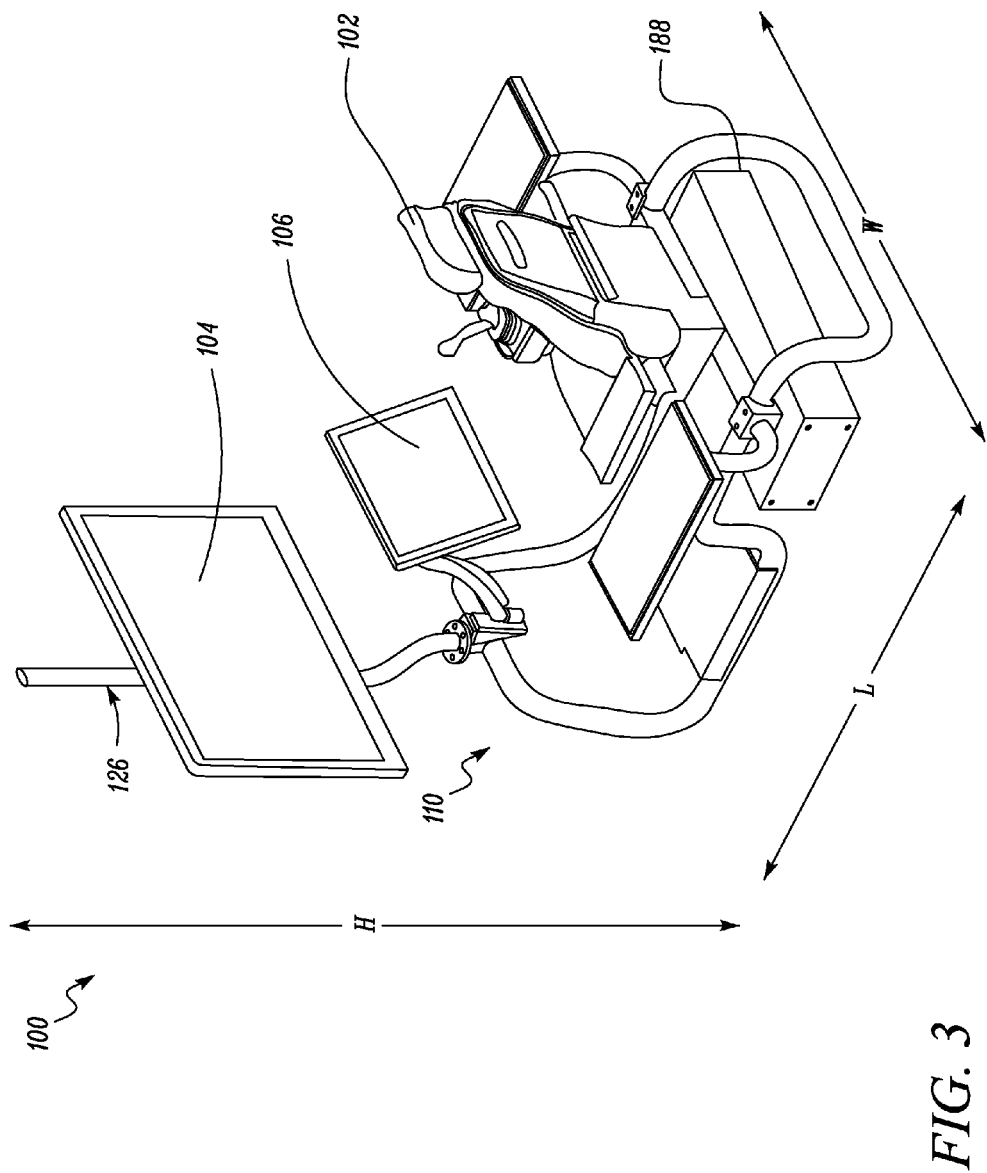
FIG. 3 illustrates a perspective view of the remote operator station.

In an exemplary embodiment as shown in FIG. 3, the mounting structure 108 may have a height H, width W, and a length L. In one embodiment, the height H may be approximately 1.8 meters, while the length L and the width W may be 1.7 meters and 1.6 meters. The height H is dimensioned to be higher than the seat height. Further, as evident in various embodiments of the present disclosure, the mounting structure 108 may be modular in construction therefore easily disassembled before transporting. Further, the mounting structure 108 may be lightweight and hence, may be easily transported from one location to another. For example, in order to be able to move the ROS 100 through a conventionally sized door, one or more of the following can be removed: the first coupling system 128 can be decoupled to remove the upright support element 126, the second coupling system 170 can be decoupled to remove the laterally extending support elements 168, the second mounting assembly 152 can be removed when the first coupling system 128 is removed, the seat 102 can be removed from the seat mount 198. The electronic and power systems can be unplugged and removed.

In an embodiment as disclosed above, the floorboard 174 includes slotted grooves 230 therein such that the foot pedals 186 are slidably disposed thereon. The slidable engagement of the foot pedals 186 allows a user to adjust a position of the pedal assembly 178 depending on the height and convenience of an operator. The configuration of the pedal plate 180 and floorboard 174 prevents dust and debris from entering therebetween. In other words, the area defined by the shape of the pedal plate 180 is such to span across at least a portion of, and preferably substantially the entire, groove arrangement 228 in order to inhibit debris and dirt from clogging the grooved arrangement. In one example, the adjuster 184 can be single adjuster to permit simple adjustment of the pedal plate 180.

Furthermore, it will be apparent to one skilled in the art that the lower end 138 of the upright support element 126 as received by the lower flange 140 provides rigidity and support to the upright support element 126 such that the upright support element 126 is configured to bear a load of the first and second interface devices 104, 106.

While aspects of the present disclosure have been particularly shown and described with reference to the embodiments above, it will be understood by those skilled in the art that various additional embodiments may be contemplated by the modification of the disclosed remote operating station without departing from the spirit and scope of what is disclosed. Such embodiments should be understood to fall within the scope of the present disclosure as determined based upon the claims and any equivalents thereof.

We claim:

1. A mounting structure for a remote operator station comprising:
 a frame comprising:
  a first section configured to support the remote operator station on a ground surface;
  a second section disposed adjacently in an elevated relation with respect to the first section;
  interconnecting members extending between the first section and the second section;
  a forward support member extending upward from an end of the first section; and
  a rearward support member extending downward from an end of the second section;
 an upright support element removably coupled to the forward support member of the frame via a first coupling system, wherein the first coupling system includes a flange coupled to the upright support element, and a lower end of the upright support element extending beyond the flange; and
 a laterally extending support element removably coupled to at least one of lateral sides of the second section of the frame via a second coupling system.

2. The mounting structure of claim 1, wherein the flange is the upper flange, and the first coupling system further includes a lower flange coupled to the forward support member of the frame, the lower flange defining an opening formed therein to receive the lower end of the upright support element, wherein the upper and lower flanges are disposed in an adjacent interconnected relationship.

3. The mounting structure of claim 2, wherein the upper and lower flanges include aligned bolt holes formed therein, the bolt holes are configured to receive a fastener therein.

4. The mounting structure of claim 1, wherein the upright support element includes a first portion substantially aligned about a first axis and configured to releasably support a first interface device, a second portion substantially aligned about a second axis offset from the first axis, and a connecting portion transversely extending between the first portion and the second portion.

5. The mounting structure of claim 1, wherein the frame includes a floorboard disposed on the first section of the frame, the floorboard includes a grooved arrangement configured to interface with a pedal plate spanning substantially the entire grooved arrangement.

6. The mounting structure of claim 5, wherein the pedal plate is slidably engaged with the groove arrangement and selectively fixed at a position on the floorboard by an adjuster.

7. The mounting structure of claim 1, wherein the first section and the second section include first and second tubular members laterally spaced apart from each other along a first plane, the first and second tubular members extending in a second plane substantially orthogonal to the first plane to converge into each other and form the forward support member and the rearward support member.

8. The mounting structure of claim 7, wherein the second section includes one or more cross bars disposed laterally to the first and second tubular members, the cross bars are configured to support a seat thereon.

9. The mounting structure of claim 7, wherein the second coupling system includes a coupler, wherein the coupler is coupled to at least one of the first and second tubular members at the second section, wherein the coupler is located adjacent to the cross bars.

10. The mounting structure of claim 9, wherein the coupler comprises:
 an interior section having a profile corresponding to a profile on the tubular members;
 an upward face defining one or more threaded receptacles configured to receive threaded fasteners therein; and
 an outward face comprising:
  at least one opening configured to receive an end portion of the laterally extending support element; and
  one or one or more threaded receptacles configured to receive threaded fasteners therein and releasably couple the laterally extending support element to the coupler.

11. The mounting structure of claim 2 further including a mounting bracket including a flap portion releasably supported between the upper flange and the lower flange, the mounting bracket configured to releasably support a second interface device of the remote operator station.

12. A remote operator station for a machine, the remote operator station comprising:
 a seat;
 a first interface device and a second interface device; and
 a mounting structure for a remote operator station including:
  a frame comprising:
   a first section configured to support the remote operator station on a ground surface;
   a second section disposed adjacently in an elevated relation with respect to the first section;
   interconnecting members extending between the first section and the second section;
   a forward support member extending upward from an end of the first section; and
   a rearward support member extending downward from an end of the second section;
  an upright support element to support the first interface device removably coupled to the forward support member of the frame via a first coupling system, wherein the first coupling system includes a flange coupled to the upright support element, and a lower end of the upright support element extending beyond the flange; and
  a laterally extending support element to support the second interface device removably coupled to at least one of lateral sides of the second section of the frame via a second coupling system;
  a controller configured to receive machine signals from the machine indicative of machine operation at a discrete location; to process the received machine signals for indication of machine operation with the first interface device; to process input signals indicative of operation of the second interface device and convert to instruction signals for a desired response of the machine; and to communicate the instruction signals to the machine.

13. The remote operator station of claim 12, wherein the flange is the upper flange, and the first coupling system further includes a lower flange coupled to the forward support member of the frame, the lower flange defining an opening formed therein to receive the lower end of the upright support element, wherein the upper and lower flanges are disposed in an adjacent interconnected relationship.

14. The remote operator station of claim 13, wherein the upper and lower flanges include aligned bolt holes formed therein, the bolt holes are configured to receive a fastener therein.

15. The remote operator station of claim 12, wherein the upright support element includes a first portion substantially aligned about a first axis and configured to releasably support the first interface device, a second portion substantially aligned about a second axis offset from the first axis, and a connecting portion transversely extending between the first portion and the second portion.

16. The remote operator station of claim 12, wherein the frame includes a floorboard disposed on the first section of the frame, the floorboard includes a grooved arrangement configured to interface with a pedal plate spanning at least a portion of the grooved arrangement.

17. The remote operator station of claim 16, wherein the pedal plate includes a plurality of pins slidably engaged with the groove arrangement, and the pedal plate is selectively fixed at a position on the floorboard by an adjuster.

18. The remote operator station of claim 12, wherein the first section and the second section include first and second tubular members laterally spaced apart from each other along a first plane, the first and second tubular members extending in a second plane substantially orthogonal to the first plane to converge into each other and form the forward support member and the rearward support member.

19. The remote operator station of claim 18, wherein the second section includes one or more cross bars disposed laterally to the first and second tubular members, the cross bars are configured to support the seat thereon.

20. A remote operator station comprising:
a frame including a first section configured to support a remote operator station on a base surface, a second section elevated with respect to the first section, a forward support member extending upward from an end of the first section, and a rearward support member extending downward from an end of the second section,
a floorboard disposed on the first section of the frame, the floorboard including a grooved arrangement;
a pedal plate to support one or more foot pedals, including a plurality of pins slidably engaged with the groove arrangement of the floor board, the pedal plate spanning substantially the entire grooved arrangement, wherein the pedal plate is slidably adjusted relative to the groove arrangement and selectively fixed at a position on the floorboard by an adjuster in a locked position;
an upright support element to support a first interface device removably coupled to the forward support member of the frame via a first coupling system, wherein the first coupling system includes a flange coupled to the upright support element, and a lower end of the upright support element extending beyond the flange;
a laterally extending support element to support a second interface device removably coupled to at least one of lateral sides of the second section of the frame via a second coupling system;
a controller configured to receive machine signals from the machine indicative of machine operation at a discrete location; to process the received machine signals for indication of machine operation with the first interface device; to process input signals indicative of operation of at least one of the second interface device and the foot pedal and convert to instruction signals for a desired response of the machine; and to communicate the instruction signals to the machine.

* * * * *